United States Patent
Hara et al.

(10) Patent No.: US 12,227,649 B2
(45) Date of Patent: Feb. 18, 2025

(54) ADDITION-CURABLE SELF-ADHESIVE SILICONE RUBBER COMPOSITION AND SILICONE RUBBER CURED PRODUCT

(71) Applicant: SHIN-ETSU CHEMICAL CO., LTD., Tokyo (JP)

(72) Inventors: Tatsuei Hara, Annaka (JP); Nobu Kato, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 847 days.

(21) Appl. No.: 17/420,230

(22) PCT Filed: Jan. 7, 2020

(86) PCT No.: PCT/JP2020/000112
§ 371 (c)(1),
(2) Date: Jul. 1, 2021

(87) PCT Pub. No.: WO2020/145249
PCT Pub. Date: Jul. 16, 2020

(65) Prior Publication Data
US 2022/0064449 A1   Mar. 3, 2022

(30) Foreign Application Priority Data
Jan. 11, 2019   (JP) .................................. 2019-003444

(51) Int. Cl.
| | |
|---|---|
| C08G 77/08 | (2006.01) |
| C08G 77/12 | (2006.01) |
| C08G 77/20 | (2006.01) |
| C08G 77/52 | (2006.01) |
| C08K 3/36 | (2006.01) |
| C08K 5/05 | (2006.01) |
| C08K 5/3475 | (2006.01) |
| C08L 83/04 | (2006.01) |
| C09J 183/04 | (2006.01) |

(52) U.S. Cl.
CPC .............. *C08L 83/04* (2013.01); *C08G 77/08* (2013.01); *C08G 77/12* (2013.01); *C08G 77/20* (2013.01); *C08G 77/52* (2013.01); *C08K 3/36* (2013.01); *C08K 5/05* (2013.01); *C08K 5/3475* (2013.01); *C09J 183/04* (2013.01); *C08K 2201/006* (2013.01); *C08L 2205/025* (2013.01); *C08L 2205/03* (2013.01)

(58) Field of Classification Search
CPC ........ C08G 77/08; C08G 77/12; C08G 77/20; C08G 77/52; C08K 3/36; C08K 5/05; C08K 5/3475; C08K 2201/006; C09J 183/04; C08L 2205/025; C08L 2205/03; C08L 83/04
USPC ....................................................... 524/862
See application file for complete search history.

(56) References Cited

U.S. PATENT DOCUMENTS

| | | |
|---|---|---|
| 5,104,919 A | 4/1992 | Okami et al. |
| 5,405,896 A | 4/1995 | Fujiki et al. |
| 5,879,809 A | 3/1999 | Muramatsu et al. |
| 5,989,704 A | 11/1999 | Hashimoto et al. |
| 6,743,515 B1 | 6/2004 | Müller et al. |
| 2009/0068475 A1 | 3/2009 | Bosshammer |
| 2014/0179863 A1* | 6/2014 | Kato ................... C08L 83/04 524/588 |
| 2018/0134871 A1* | 5/2018 | Kato ................... C08L 83/04 |
| 2019/0092944 A1 | 3/2019 | Mizushima et al. |

FOREIGN PATENT DOCUMENTS

| | | |
|---|---|---|
| EP | 0 276 790 A2 | 8/1988 |
| JP | 63-183843 A | 7/1988 |
| JP | 2-34311 B2 | 8/1990 |
| JP | 2-242854 A | 9/1990 |
| JP | 6-172738 A | 6/1994 |

(Continued)

OTHER PUBLICATIONS

International Search Report for PCT/JP2020/000112 mailed on Feb. 10, 2020.

(Continued)

*Primary Examiner* — Kelechi C Egwim
(74) *Attorney, Agent, or Firm* — Birch, Stewart, Kolasch & Birch, LLP

(57) ABSTRACT

The present invention provides an addition-curable self-adhesive silicone rubber composition and a silicone rubber cured product.

An addition-curable self-adhesive silicone rubber composition which contains:

a predetermined amount of (A) an alkenyl group-containing organopolysiloxane which has at least two alkenyl groups that are bonded to silicon atoms in each molecule;

a predetermined amount of (B-1) an organosilicon compound having 1-100 silicon atoms, which has at least one phenylene skeleton in each molecule, while having at least one hydrogen atom that is bonded to a silicon atom;

a predetermined amount of (B-2) an organohydrogen polysiloxane which contains at least two hydrogen atoms that are bonded to silicon atoms in each molecule, and which does not contain an aromatic group;

a predetermined amount of (C) a platinum-based catalyst;

a predetermined amount of (D) a benzotriazole derivative; and a predetermined amount of (E) an acetylene alcohol compound or a compound which is obtained by modifying an alcoholic hydroxyl group of the acetylene alcohol compound with a silane or a siloxane.

6 Claims, No Drawings

(56) References Cited

FOREIGN PATENT DOCUMENTS

| | | |
|---|---|---|
| JP | 9-165516 A | 6/1997 |
| JP | 9-165517 A | 6/1997 |
| JP | 2001-200162 A | 7/2001 |
| JP | 2008-537967 A | 10/2008 |
| JP | 2014-122271 A | 7/2014 |
| JP | 2017-2165 A | 1/2017 |
| JP | 2017-165931 A | 9/2017 |

OTHER PUBLICATIONS

Written Opinion of the International Searching Authority for PCT/JP2020/000112 (PCT/ISA/237) mailed on Feb. 10, 2020.

* cited by examiner

ADDITION-CURABLE SELF-ADHESIVE SILICONE RUBBER COMPOSITION AND SILICONE RUBBER CURED PRODUCT

TECHNICAL FIELD

The present invention relates to an addition-curable self-adhesive silicone rubber composition and a silicone rubber cured product obtained by curing such a composition.

BACKGROUND ART

Silicone rubbers, owing to their heat resistance, cold resistance, safety, electrical insulating properties, weather resistance and durability, are used in a wide range of fields, including hose and gasket materials for vehicles, electrical and electronic parts such as copier rollers and microwave oven gaskets, building components and textile coating materials. Of these various applications, cases where silicone rubbers are used as parts in which they are combined with metals, organic resins or the like are not uncommon.

Many methods have been described for manufacturing articles in which a cured product of an addition-curable silicone rubber composition is integrated with a metal or an organic resin. Typical methods include coating the surface of a molded resin with a primer and then applying thereto and curing an uncured silicone rubber composition to adhesively join the materials, integrally uniting both materials by coating an interface therebetween with an adhesive, two-color molding to mutually engage and thus integrally unite the materials, and curing a self-adhesive silicone rubber composition on a molded resin.

However, the use of an adhesive or a primer adds to the number of steps and, depending on the coating method, sometimes results in the contamination of non-adhering surfaces. Drawbacks of the two-color molding method include limitations on the shape of integrally formed articles and insufficient interfacial adhesion. One solution is a self-adhesive silicone rubber composition obtained by adding an adhesive to a silicone rubber composition. The use of such a self-adhesive silicone rubber composition eliminates the need for a coating step, making it possible to shorten the production time, reduce costs and improve the efficiency of operations. This is thus an effective way to manufacture silicone rubber articles that are integrally molded with resins.

A number of methods for adhering with organic resins have been described in connection with the primerless molding of addition-type heat-curable silicone rubber compositions. One such method involves curing a self-adhesive silicone rubber composition on a resin: numerous disclosures that specify adhesive components for use in such compositions have been made. Other methods that have been described include adding an organohydrogenpolysiloxane containing at least 30 mol % of hydrogen atoms directly bonded to silicon atoms to an organic resin and adhesively joining the organic resin with an addition reaction-curable silicone rubber composition (Patent Document 1: JP-B H02-34311): integrally adhering a silicone rubber composition with an olefin resin to which is grafted a compound containing an aliphatic unsaturated group and a silicon-bonded hydrolyzable group (Patent Document 2: JP-A S63-183843): a method for integrally and adhesively joining a thermoplastic resin to which has been added a compound containing an aliphatic unsaturated group and a hydrogen atom directly bonded to a silicon atom with a silicone rubber composition, and an article integrally molded from a resin obtained by blending a thermoplastic resin with an aliphatic unsaturated group-containing thermoplastic oligomer in combination with an oil-bleeding silicone rubber (Patent Document 3: JP-A H09-165516; Patent Document 4: JP-A H09-165517); and, in a self-adhesive addition-crosslinkable silicone rubber composition, adding an organohydrogenpolysiloxane having SiH bonds and an aromatic skeleton on the molecule as an adhesion-enhancing material to the silicone rubber composition so that the composition adheres with organic resins and metals (Patent Document 5: JP-A H06-172738; Patent Document 6: JP-A 2001-200162; Patent Document 7: JP-A 2008-537967). To achieve a rapid low-temperature cure in the foregoing methods, it is necessary either to increase the amount of catalyst or to reduce the amount of regulator. However, this poses a problem in terms of the pot life. One solution that has been proposed involves the addition of a very small amount of a triazole compound to a self-adhesive addition-crosslinkable silicone rubber composition so as to make the composition suitable for use even when the organic resin has a low softening point and rapidly curable at low temperature and to give the composition a pot life that provides sufficient ease of operation (Patent Document 8: JP-A 2014-122271).

When the above addition-curable self-adhesive silicone rubbers are used as O-rings, gaskets and the like, they are required to have a low compression set in order to prevent seal leakage. In general, to lower the compression set, it is necessary to additionally subject rubber that has already been heat-cured and molded to prolonged secondary vulcanization at an elevated temperature. However, when a self-adhesive silicone rubber is used in combination with an organic resin, because organic resins have a low heat resistance, deformation or degradation of the resin sometimes arises. The method of adding a triazole compound to an addition-curable silicone rubber composition so as to lower the compression set without carrying out secondary vulcanization has also been described (Patent Document 9: JP-A H02-242854). However, the rate of cure in this case declines: when molding is carried out at a low temperature (120° C. or less) in particular, the molding time becomes too long. Moreover, the compression set cannot be improved when, as in Patent Document 8, the triazole compound is used in a very small amount of a degree such as not to compromise the curability.

PRIOR ART DOCUMENTS

Patent Documents

Patent Document 1: JP-B H02-34311
Patent Document 2: JP-A S63-183843
Patent Document 3: JP-A H09-165516
Patent Document 4: JP-A H09-165517
Patent Document 5: JP-A H06-172738
Patent Document 6: JP-A 2001-200162
Patent Document 7: JP-A 2008-537967
Patent Document 8: JP-A 2014-122271
Patent Document 9: JP-A H02-242854

SUMMARY OF INVENTION

Technical Problem

The present invention was conceived in light of the above circumstances. The object of the invention is to provide, for articles that are integrally molded from a silicone rubber composition and a thermoplastic resin and intended for use in automotive components, communications equipment and various electrical and electronic products, an addition-curable self-adhesive silicone rubber composition which can be molded at a relatively low temperature and in a short time, yet has a pot life sufficient for working, and which moreover can give a cured product having a low compression set. A further object is to provide a silicone rubber cured product obtained from such a composition.

Solution to Problem

The inventors have conducted extensive investigations in order to achieve these objects. As a result, they have discovered that by using an addition-curable self-adhesive silicone rubber composition comprising:
- (A) an alkenyl group-containing organopolysiloxane having at least two silicon-bonded alkenyl groups per molecule,
- (B-1) an organosilicon compound of 1 to 100 silicon atoms having at least one phenylene skeleton and at least one silicon-bonded hydrogen atom per molecule,
- (B-2) an organohydrogenpolysiloxane that has at least two silicon-bonded hydrogen atoms per molecule and is free of aromatic groups,
- (C) a platinum-based catalyst, and
- (E) an acetylene alcohol compound or a compound obtained by modifying the alcoholic hydroxyl group thereon with a silane or siloxane, wherein the ratios of the number of moles of silicon-bonded hydrogen atoms in, respectively, components (B-1) and (B-2) relative to the total number of moles of silicon-bonded hydrogen atoms in components (B-1) and (B-2) are set to specific values, and which additionally includes (D) a benzotriazole derivative in an effective amount per mole of platinum atoms in component (C), the composition can be molded at a relatively low temperature and in a short time, yet has a sufficient pot life for working, and moreover enables a cured product of low compression set to be obtained. These discoveries ultimately led to the present invention.

Accordingly, the present invention provides the following addition-curable self-adhesive silicone rubber composition and silicone rubber cured product.

[1]
An addition-curable self-adhesive silicone rubber composition comprising:
- (A) 100 parts by weight of an alkenyl group-containing organopolysiloxane having at least two silicon-bonded alkenyl groups per molecule;
- (B-1) 0.05 to 10 parts by weight of an organosilicon compound of from 1 to 100 silicon atoms having at least one phenylene skeleton and at least one silicon-bonded hydrogen atom per molecule;
- (B-2) 0.2 to 30 parts by weight of an organohydrogenpolysiloxane that has at least two silicon-bonded hydrogen atoms per molecule and is free of aromatic groups, such that the numbers of moles of silicon-bonded hydrogen groups (Si—H groups) in, respectively, component (B-1) and component (B-2) relative to the total number of moles of silicon-bonded hydrogen atoms (total Si—H groups) in components (B-1) and (B-2) satisfy the condition [Si—H groups (B-1)]/[total Si—H groups]=1 to 50 mol % and [Si—H groups (B-2)]/[total Si—H groups]=50 to 99 mol %;
- (C) a platinum-based catalyst in an amount, expressed in terms of the weight of platinum metal with respect to the total weight of components (A), (B-1) and (B-2), that is from 0.5 to 500 ppm;
- (D) a benzotriazole derivative of the general formula (I) below:

[Chem. 1]

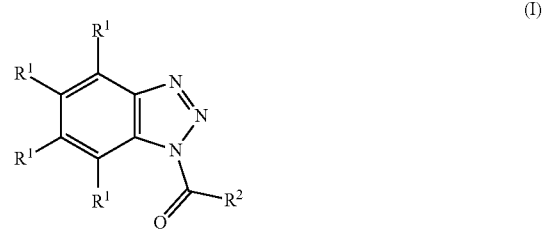

wherein $R^1$ is a hydrogen atom or a monovalent hydrocarbon group of 1 to 6 carbon atoms, $R^2$ is a monovalent hydrocarbon group of 1 to 15 carbon atoms or a group of the formula (I') below:

[Chem. 2]

wherein $R^3$ is —$(CH_2)_a$—$Si(OR^4)_3$, $R^4$ is an alkyl group of 1 to 4 carbon atoms or a $SiR^5_3$ group ($R^5$ being an alkyl group of 1 to 4 carbon atoms), a is an integer from 1 to 6, and * represents a site available for bonding, in an amount of 2 to 100 moles per mole of platinum atoms in component (C); and
- (E) an acetylene alcohol compound or a compound obtained by modifying the alcoholic hydroxyl group thereon with a silane or siloxane, in an amount of 1 to 500 moles of acetylene per mole of platinum atoms in component (C).

[2]
The addition-curable self-adhesive silicone rubber composition of [1], wherein the molar ratio of total Si—H groups to the sum of the alkenyl groups in the silicone rubber composition (total alkenyl groups), expressed as [total Si—H groups/total alkenyl groups], is from 2.0 to 3.0.

[3]
The addition-curable self-adhesive silicone rubber composition of [1] or [2], further comprising (F) a reinforcing silica fine powder in an amount of 5 to 100 parts by weight per 100 parts by weight of component (A).

[4]
The addition-curable self-adhesive silicone rubber composition of [3], wherein component (F) is a fumed silica having a BET specific surface area of at least 50 m²/g.

[5]
The addition-curable self-adhesive silicone rubber composition of any of [1] to [4] which, letting the viscosities at a shear rate of 0.9 s$^{-1}$ after being uniformly mixed and left at rest at 25° C. for 10 minutes and after being uniformly mixed and left at rest at 25° C. for 24 hours be respectively $\eta_0$ and $\eta_{24}$, satisfies the condition $\eta_{24}/\eta_0 \leq 2$.

[6]
A silicone rubber cured product obtained by curing the silicone rubber composition of any of [1] to [5], has a compression set, as measured after 22 hours of compression at a compressibility of 25% and 150° C. based on JIS K 6249:2003, that is 30% or less.

Advantageous Effects of Invention

This invention makes it possible to provide addition-curable self-adhesive silicone rubber compositions which, without compromising the cure rate, are able to give silicone rubbers having a low compression set and excellent adhesion with various types of organic resins, and also silicone rubber cured products obtained by curing such compositions.

DESCRIPTION OF EMBODIMENTS

The invention is described in detail below.
[Addition-Curable Self-Adhesive Silicone Rubber Composition]
The addition-curable self-adhesive silicone rubber composition of the invention includes components (A), (B-1), (B-2), (C), (D) and (E) below.
(A) Alkenyl Group-Containing Organopolysiloxane
The organopolysiloxane having at least two silicon-bonded alkenyl groups per molecule serving as component (A) is the base polymer of the composition. One having the average compositional formula (II) below may be used.

$$R^6_b SiO_{(4-b)/2} \tag{II}$$

In the formula, each $R^6$ is independently same or different, unsubstituted or substituted monovalent hydrocarbon group of 1 to 10 carbon atoms, preferably 1 to 8 carbon atoms; and b is a positive number in the range of 1.5 to 2.8, preferably 1.8 to 2.5, and more preferably 1.95 to 2.05.

Examples of the unsubstituted or substituted monovalent hydrocarbon group of 1 to 10 carbons represented by $R^6$ include alkyl groups such as methyl, ethyl, propyl, isopropyl, butyl, isobutyl, tert-butyl, pentyl, neopentyl, hexyl, cyclohexyl, octyl, nonyl and decyl groups: aryl groups such as phenyl, tolyl, xylyl and naphthyl groups: aralkyl groups such as benzyl, phenylethyl and phenylpropyl groups: alkenyl groups such as vinyl, allyl, propenyl, isopropenyl, butenyl, hexenyl, cyclohexenyl and octenyl groups; and any of these groups in which some or all hydrogen atoms are substituted with fluorine, bromine, chlorine or other halogen atoms, cyano groups or the like, such as chloromethyl, chloropropyl, bromoethyl, trifluoropropyl and cyanoethyl groups. Preferably at least 90 mol % of all $R^6$ groups, more preferably all $R^6$ groups other than alkenyl groups, are methyl groups.

At least two $R^6$ groups must be alkenyl groups (preferably ones having 2 to 8 carbon atoms, more preferably ones having 2 to 6 carbon atoms, and most preferably vinyl groups).

The alkenyl group content is set to preferably from $1.0 \times 10^{-6}$ to $5.0 \times 10^{-3}$ mol/g, and more preferably from $1.0 \times 10^{-5}$ to $2.0 \times 10^{-3}$ mol/g. At a content of from $1.0 \times 10^{-6}$ to $5.0 \times 10^{-3}$ mol/g, a rubber-like material can be obtained.

The alkenyl groups may be bonded to silicon atoms at the ends of the molecular chain, may be bonded to silicon atoms partway along the molecular chain, or may be bonded to both.

This organopolysiloxane has a structure that is basically a linear structure in which the backbone consists of repeating diorganosiloxane units and both ends of the molecular chain are capped with triorganosiloxy groups, although it may have a branched structure, cyclic structure or the like in places.

The organopolysiloxane has a molecular weight such that the average degree of polymerization (here and below, number-average degree of polymerization) is generally from 100 to 1,500, and preferably from 150 to 1,000. At an average degree of polymerization of 100 to 1,500, a rubber-like material can be obtained and the moldability is good. This average degree of polymerization can generally be determined as a polystyrene equivalent value by gel permeation chromatography (GPC) using toluene as the developing solvent.

So long as component (A) is an organopolysiloxane having silicon-bonded alkenyl groups at both ends of the molecular chain, one, two or more types of differing molecular structure or degree of polymerization may be used together.
(B-1) Organosilicon Compound Having Phenylene Skeleton and Silicon-Bonded Hydrogen Atom
Component (B-1), which serves as a tackifying component (adhesion modifier) and also as a crosslinking agent, is an organosilicon compound such as an organosilane or an organopolysiloxane which has at least one silicon-bonded hydrogen atom (SiH group) and at least one phenylene skeleton per molecule, and generally has about 1 to 100, preferably about 2 to 30, silicon atoms on the molecule. In this invention, "phenylene skeleton" encompasses polyvalent aromatic cyclic structures such as divalent to hexavalent, especially divalent to tetravalent, phenylene structures, naphthalene structures and anthracene structures.

Organosilicon compounds such as linear or cyclic organosiloxane oligomers or organoalkoxysilanes of about 1 to 30, preferably about 2 to 20, and especially about 4 to 10, silicon atoms which have at least 1, generally about 1 to 20, and especially about 2 to 10, SiH groups and at least 1, and generally from 1 to 4, phenylene skeletons per molecule, and which may have moreover one or more functional group, such as epoxy groups (e.g., the glycidoxy group), alkoxysilyl groups (e.g., trimethoxysilyl, triethoxysilyl and methyldimethoxysilyl groups), ester groups, acrylic groups, methacrylic groups, carboxyl anhydride groups, isocyanate groups, amino groups and amide groups can be suitably used as the above compound.

Specific examples of such compounds include the compounds shown below:

[Chem. 3]

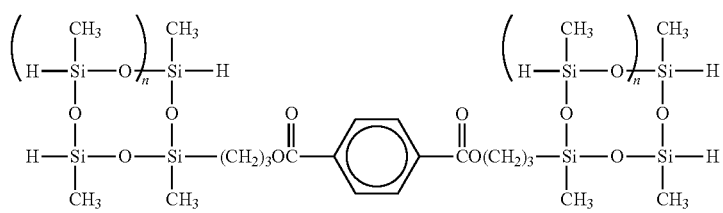

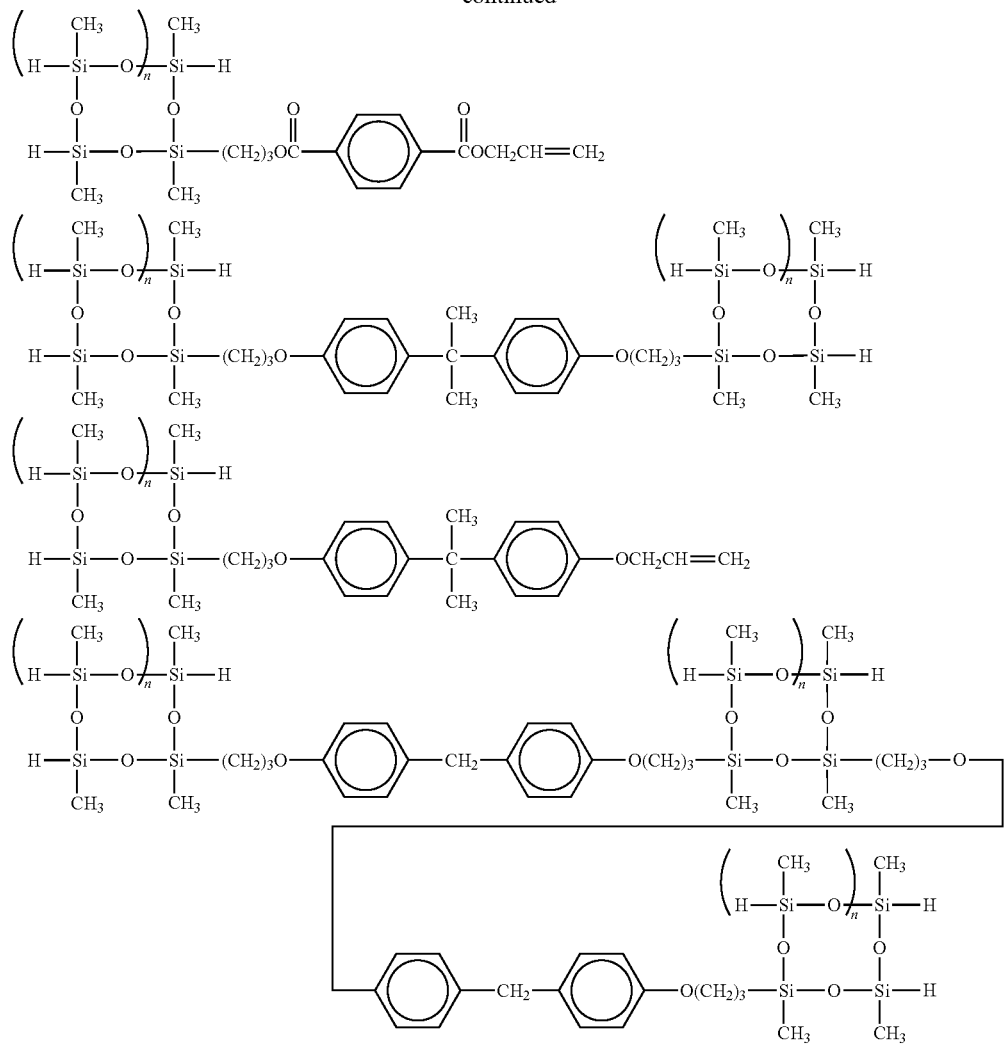
wherein n=1 to 4.
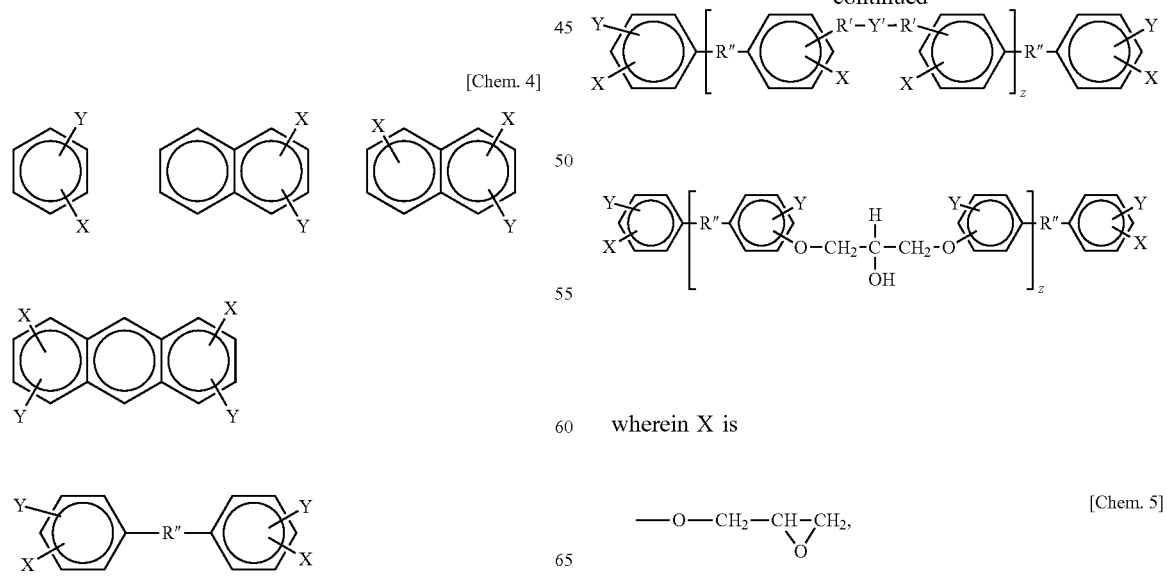
wherein X is and
Y is

[Chem. 6]

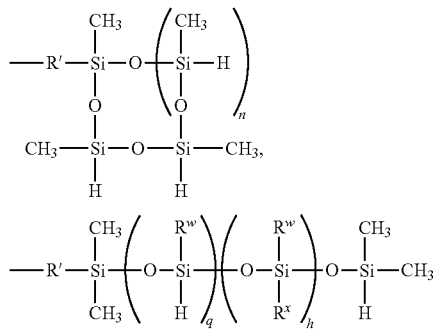

wherein R' is a group selected from:

[Chem. 7]

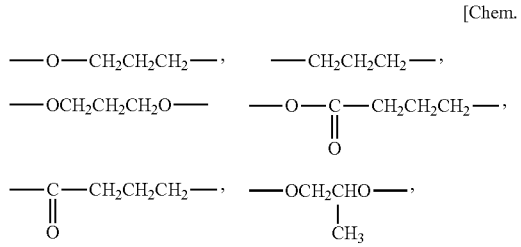

$R^w$ and $R^x$ are each unsubstituted or substituted monovalent hydrocarbon groups; and n=1 to 4, q=1 to 50 and n=0 to 100, preferably q=1 to 20 and h=1 to 50), R'' is a group selected from:

[Chem. 8]

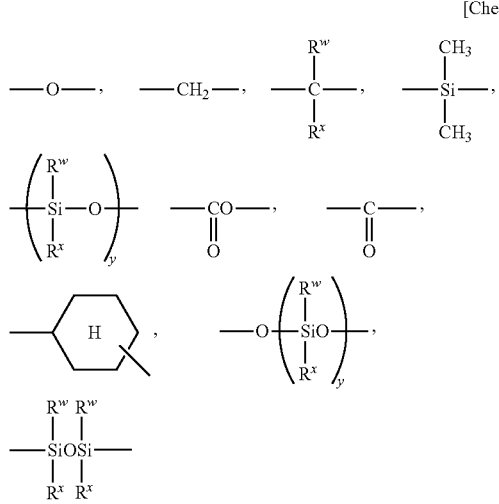

wherein $R^w$ and $R^x$ are as defined above, and y=0 to 100,
Y' is a group selected from:

[Chem. 9]

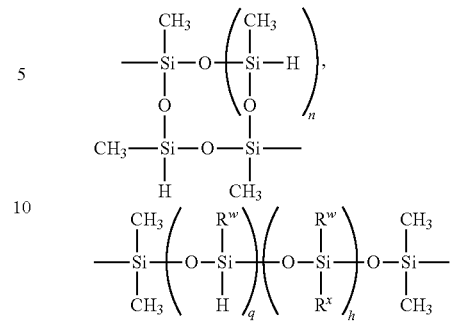

wherein $R^w$, $R^x$, n, q and h are as defined above, and z=1 to 10.

In addition, organic compounds and organosilicon compounds having alkoxysilyl groups (e.g., trimethoxysilyl, triethoxysilyl and methyldimethoxysilyl groups), acrylic groups, methacrylic groups, ester groups, carboxyl anhydride groups, isocyanate groups, amino groups and amide groups may also be used as the organosilicon compound of component (B-1).

The unsubstituted or substituted monovalent hydrocarbon groups represented by $R^w$ and $R^x$ are ones having preferably from 1 to 12, especially from 1 to 8, carbon atoms, and are exemplified by the same groups mentioned above in connection with $R^6$, such as alkyl groups, aryl groups, aralkyl groups and alkenyl groups: they are also exemplified by, as substituted monovalent hydrocarbon groups, groups substituted with alkoxy, acrylic, methacrylic, acryloyl, methacryloyl, amino and alkylamino groups.

Component (B-1) is included in an amount, per 100 parts by weight of component (A), which is from 0.05 to 10 parts by weight, preferably from 0.1 to 9 parts by weight, and more preferably from 0.2 to 8 parts by weight. At a content of from 0.05 to 10 parts by weight, the adhesion is good. The organosilicon compound having a phenylene skeleton of component (B-1) may be of one type used alone or two or more may be used together.

(B-2) Organohydrogenpolysiloxane

The organohydrogenpolysiloxane of component (B-2) is an organohydrogenpolysiloxane which has at least 2, preferably 3 or more, silicon-bonded hydrogen atoms (SiH groups) per molecule, is free of aromatic groups such as phenyl groups and phenylene skeletons on the molecule, and does not correspond to component (B-1). It is suitable for the organohydrogenpolysiloxane used as component (B-2) to be one that is represented by average compositional formula (III) below and has at least 2 (generally from 2 to 200), preferably 3 or more (generally from 3 to 200), more preferably about 5 to 100, and even more preferably about 8 to 50, SiH groups per molecule:

$$R^7{}_c H_d SiO_{(4-c-d)/2} \quad \text{(III)}$$

wherein $R^7$ is an unsubstituted or substituted aliphatic monovalent hydrocarbon group of 1 to 10 carbon atoms, c is a positive number from 0.7 to 2.1, d is a positive number from 0.001 to 1.0, and c+d is a positive number from 0.8 to 3.0.

In this formula, the unsubstituted or substituted aliphatic monovalent hydrocarbon group represented by $R^7$ may be exemplified by the same groups as those mentioned above as examples of $R^6$ in average compositional formula (II) representing component (A), although it is not an aryl group such phenyl or an aromatic group such as an aralkyl group. It is preferably an aliphatic saturated hydrocarbon group, i.e., a group other than alkenyl and other groups having an aliphatic unsaturated bond. An alkyl group, especially a methyl group, is especially preferred.

Also, c is a positive number from 0.7 to 2.1, and preferably from 0.8 to 2.0; d is a positive number from 0.001 to 1.0, and preferably from 0.01 to 1.0; and c+d is a positive number from 0.8 to 3.0, and preferably from 1.0 to 2.5.

The molecular structure of the organohydrogenpolysiloxane of component (B-2) may be linear, cyclic, branched or a three-dimensional network structure. In this case, the number of silicon atoms on the molecule (or the degree of polymerization) is generally from 2 to 300, preferably from 3 to 200, more preferably from 10 to 200, and even more preferably from 15 to 100. An organohydrogenpolysiloxane that is liquid at room temperature (25° C.) may be suitably used.

The silicon-bonded hydrogen atoms may be positioned at the ends of the molecular chain or partway along the molecular chain (at non-terminal positions on the molecular chain), or may be positioned at both.

Examples of the organohydrogenpolysiloxane of component (B-2) include 1,1,3,3-tetramethyldisiloxane, 1,3,5,7-tetramethylcyclotetrasiloxane, methylhydrogencyclopolysiloxane, methylhydrogencyclosiloxane-dimethylsiloxane cyclic copolymers, tris(dimethylhydrogensiloxy)methylsilane, methylhydrogenpolysiloxane capped at both ends with trimethylsiloxy groups, dimethylsiloxane-methylhydrogensiloxane copolymers capped at both ends with trimethylsiloxy groups, dimethylpolysiloxanes capped at both ends with dimethylhydrogensiloxy groups, dimethylsiloxane-methylhydrogensiloxane copolymers capped at both ends with dimethylhydrogensiloxy groups, copolymers consisting of $(CH_3)_2HSiO_{1/2}$ units and $SiO_{4/2}$ units, copolymers consisting of $(CH_3)_3SiO_{1/2}$ units, $(CH_3)_2HSiO_{1/2}$ units and $SiO_{4/2}$ units, copolymers consisting of $(CH_3)_2HSiO_{1/2}$ units, $SiO_{4/2}$ units and $(CH_3)SiO_{3/2}$ units, and copolymers consisting of $(CH_3)_2HSiO_{1/2}$ units, $SiO_{4/2}$ units and $(CH_3)_2SiO_{2/2}$ units.

The silicon-bonded hydrogen atom (SiH group) content in the organohydrogenpolysiloxane of component (B-2) is preferably from 0.0005 to 0.017 mol/g, and more preferably from 0.0008 to 0.017 mol/g. At a content of from 0.0005 to 0.017 mol/g, crosslinking is sufficient and a stable material can be obtained.

The organohydrogenpolysiloxane of component (B-2) is included in an amount, per 100 parts by weight of component (A), which is from 0.2 to 30 parts by weight, preferably from 0.2 to 20 parts by weight, and more preferably from 0.3 to 15 parts by weight. By setting the amount included to from 0.2 to 30 parts by weight, the curability is good and the compression set is also good. The organohydrogenpolysiloxane of component (B-2) may be of one type used alone or two or more may be used together.

Component (B-1) and component (B-2) are included in ratios such that the numbers of moles of silicon-bonded hydrogen atoms (Si—H groups) in these respective components with respect to the total number of moles of silicon-bonded hydrogen atoms (total Si—H groups) are as follows. That is, [Si—H groups (B-1)]/[total Si—H groups] is from 1 to 50 mol %, preferably from 1 to 30 mol %, and more preferably from 1 to 25 mol %; and [Si—H groups (B-2)]/[total Si—H groups] is from 50 to 99 mol %, preferably from 70 to 99 mol %, and more preferably from 75 to 99 mol %. When the ratios in which components (B-1) and (B-2) are included are such that the amount of component (B-1) exceeds 50 mol %, the curability worsens and the compression set becomes larger, which is undesirable. On the other hand, when the amount of component (B-1) is less than 1 mol %, adhesive properties may not appear, which is undesirable.

The total amount in which these components (B-1) and (B-2) are included is preferably such that the molar ratio between the total Si—H groups in the organohydrogenpolysiloxanes of components (B-1) and (B-2) combined and the total amount of alkenyl groups in the composition (i.e., in cases where, in addition to the alkenyl groups of component (A) mentioned above, an ingredient containing alkenyl groups is included as subsequently described component (E), the sum of the alkenyl groups in components (A) and (E)), expressed as (total Si—H groups/total alkenyl groups), is from 2.0 to 3.0, and preferably from 2.0 to 2.8. By having the total amount of components (B-1) and (B-2) be such that the molar ratio is from 2.0 to 3.0, a good curability and a good compression set are obtained.

(C) Platinum-Based Catalyst

Component (C) is exemplified by platinum-based catalysts such as platinum black, platinic chloride, chloroplatinic acid, reaction products of chloroplatinic acid with primary alcohols, complexes of chloroplatinic acid and olefins, and platinum bisacetoacetate.

The amount in which this platinum-based catalyst is included may be set to a catalytic amount, and is generally set to from about 0.5 to about 500 ppm, especially from about 1 to about 200 ppm, in terms of platinum metal (weight basis) with respect to the total weight of components (A), (B-1) and (B-2). The platinum-based catalyst of component (C) may be of one type used alone or two or more may be used together.

(D) Benzotriazole Derivative

Component (D) is a benzotriazole derivative of the general formula (I) below:

[Chem. 10]

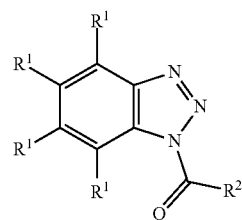

(I)

wherein $R^1$ is a hydrogen atom or a monovalent hydrocarbon group of 1 to 6 carbon atoms, $R^2$ is a monovalent hydrocarbon group of 1 to 15 carbon atoms or a group of the formula (I') below:

[Chem. 11]

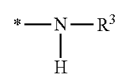

(I')

wherein $R^3$ is $—(CH_2)_a—Si(OR^4)_3$, $R^4$ is an alkyl group of 1 to 4 carbon atoms or a $SiR^5_3$ group ($R^5$ being an alkyl group of 1 to 4 carbon atoms), a is an integer from 1 to 6, and * represents a site available for bonding, which, through interactions with the platinum-based catalyst of component (C), lowers the compression set of the silicone rubber after curing and enables a pot life sufficient for working to be obtained.

Here, $R^1$ is a hydrogen atom or a monovalent hydrocarbon group of 1 to 6 carbon atoms. Examples of the monovalent hydrocarbon group of 1 to 6 carbon atoms include alkyl groups such as methyl, ethyl, propyl, isopropyl, butyl, isobutyl, tert-butyl, pentyl, neopentyl, hexyl and cyclohexyl groups; and any of these groups in which some or all hydrogen atoms are substituted with fluorine, bromine, chlorine or other halogen atoms, cyano groups or the like, examples of which include chloromethyl, chloropropyl, bromoethyl, trifluoropropyl and cyanoethyl groups. Of these, from the standpoint of synthesis, a hydrogen atom or a methyl group is preferred.

Specific examples of benzotriazole derivatives include those of the following formulas:

[Chem. 12]

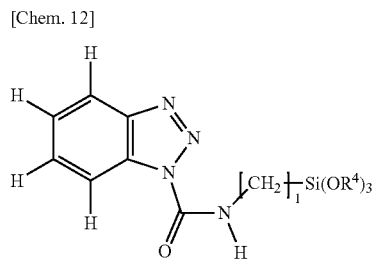

wherein the subscript l is an integer from 1 to 6, and $R^4$ is an alkyl or trialkylsilyl group.

Of these, the most preferred benzotriazole derivatives are those of the following formulas:

[Chem. 13]

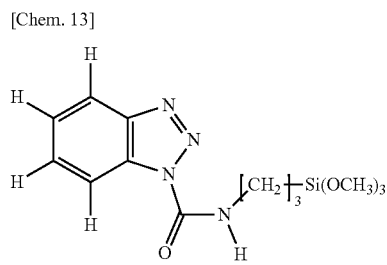

[Chem. 14]

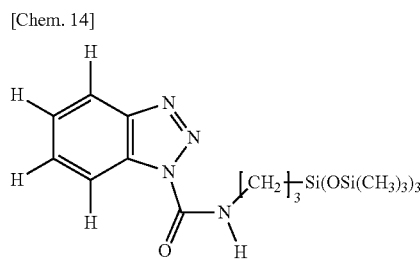

The amount of component (D) included per mole of platinum atoms in component (C) is from 2 to 100 moles, preferably from 5 to 75 moles, and more preferably from 10 to 50 moles. At a content of from 2 to 100 moles, the curability and the compression set are good, in addition to which a pot life sufficient for working can be obtained. The benzotriazole derivative of component (D) may be of one type used alone or two or more may be used together.

(E) Acetylene Alcohol Compound or Silane or Siloxane-Modified Compound Thereof

Component (E) is an acetylene alcohol compound or a compound obtained by modifying the alcoholic hydroxyl group thereon with a silane or siloxane. This component (E) functions as a reaction regulator with respect to the platinum-based catalyst of component (C); the cure initiation time can be controlled by the amount of addition thereof.

The acetylene alcohol compound of component (E) should be one having an ethynyl group and a hydroxyl group present on the same molecule, with the ethynyl group and the hydroxyl group preferably being bonded to the same carbon atom. Specific examples include the following compounds:

[Chem. 15]

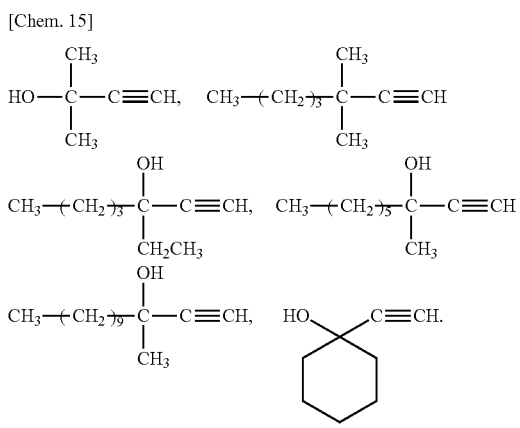

The modified compound in which the alcoholic hydroxyl group on the acetylene alcohol compound has been modified with a silane or siloxane is a compound in which the hydroxyl group on the acetylene has bonded with a silane or siloxane and been converted to a Si—O—C bond. Examples include the following compounds:

[Chem. 16]

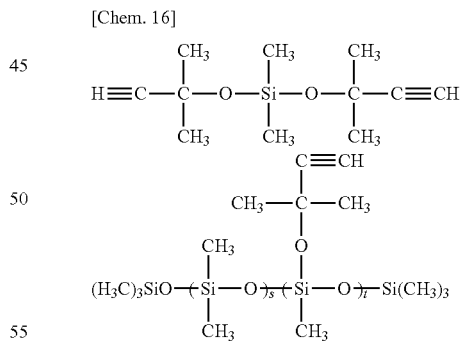

wherein s is an integer from 0 to 50, preferably from 3 to 20; and t is an integer from 1 to 50, preferably from 3 to 20.

Component (E) is included in an amount such that the ratio of acetylene to the platinum atoms (Pt) in the platinum-based catalyst of component (C) is from 1 to 500 mol/mol, preferably from 1 to 300 mol/mol, and more preferably from 2 to 200 mol/mol. At a content of from 1 to 500 mol/mol, the curability is good and a pot life sufficient for working can be obtained. Component (E) may be of one type used alone or two or more may be used together.

(F) Reinforcing Silica Fine Powder

The silicone rubber composition of the invention preferably includes a reinforcing silica fine powder as component (F). The reinforcing silica fine powder of component (F) is not particularly limited as to the type of silica, so long as it is one that is typically used as a rubber reinforcing agent. The reinforcing silica fine powder used in this invention, which may be one that is used in conventional silicone rubber compositions, has a BET specific surface area of at least 50 m$^2$/g. In particular, the use of a precipitated silica (wet silica), fumed silica (dry silica), pyrogenic silica or the like having a BET specific surface area of from 50 to 400 m$^2$/g, especially from 100 to 350 m$^2$/g, is preferred. Fumed silica is preferred because it improves the rubber strength. This reinforcing silica fine powder may be a silica fine powder that has been subjected to surface hydrophobization with the subsequently described surface treatment agent. Here, the silica fine powder may be one which has been subjected beforehand, in the state of a powder, directly to surface hydrophobization with a surface treatment agent, or may be one which has been surface hydrophobized by the addition of a surface treatment agent during kneading with a silicone oil (e.g., the alkenyl group-containing organopolysiloxane of component (A)).

The surface treatment method may be one in which surface treatment is carried out by a known process, such as charging the untreated silica fine powder and the surface treatment agent into a mechanical kneading apparatus sealed at normal pressure or a fluidized bed and mixing these together at room temperature or under heating (applied heat) and, where necessary, in the presence of an inert gas. In some cases, surface treatment may be accelerated by using a catalyst (e.g., a hydrolysis promoter). Following such mixture, the surface-treated silica fine powder can be obtained by drying. The amount of surface treatment agent included should be set at or above the amount calculated from the surface area to be coated by the treatment agent.

Specific examples of the surface treatment agent include silazanes such as hexamethyldisilazane: silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy) silane, trimethylchlorosilane, dimethyldichlorosilane, divinyldimethoxysilane and chloropropyltrimethoxysilane: polymethylsiloxanes and organohydrogenpolysiloxanes. The silicon fine powder is surface treated with these and used as a hydrophobic silica fine powder. A silane coupling agent or a silazane is especially preferred as the surface treatment agent. The silica fine powder of component (F) may be of one type used alone or two or more types may be used together.

In addition to the components described above, where necessary, various additives may be optionally included in the addition-curable self-adhesive silicone rubber composition of the invention. Such additives that may be added include the following inorganic fillers: metal oxides such as titanium oxide, iron oxide, cerium oxide, vanadium oxide, cobalt oxide, chromium oxide and manganese oxide, as well as complex oxides thereof: quartz powder, diatomaceous earth, calcium carbonate, magnesium carbonate, alumina, carbon, hollow glass microspheres and hollow resin microspheres: gold, silver, copper and other inorganic powders having electrical conductivity; and plating powders. Pigments, heat stabilizers, flame retardants, plasticizers and the like may also be added, provided that doing so does not detract from the desired properties. The amounts in which these optional ingredients are added may be set to the usual amounts within ranges that do not compromise the advantageous effects of the invention.

[Preparation of Addition-Curable Self-Adhesive Silicone Rubber Composition]

Although it is possible to obtain the addition-curable self-adhesive silicone rubber composition of the invention simply by uniformly mixing components (A) to (E) and any optional components at normal temperature, it is preferable to heat-treat component (F) with a surface treatment agent, water and some or all of component (A) in a planetary mixer, kneader or the like at a temperature between 100° C. and 200° C. for 1 to 4 hours, cool the resulting mixture to room temperature, and then add and mix in the remaining components and optional components.

The inventive composition has a viscosity, at 25° C. and a shear rate of 0.9 s$^{-1}$, which is preferably from 50 to 5,000 Pa·s, more preferably from 80 to 4,000 Pa·s, and even more preferably from 100 to 3,000 Pas. When this viscosity is less than 50 Pas or more than 5,000 Pa·s, molding may be difficult.

In the practice of the invention, the viscosity can be measured with the following shear viscometer: HAAKE MARS 40 Rheometer (Thermo Fischer Scientific).

In the inventive composition, when above components (A) to (E) and any optional components are uniformly mixed, letting the viscosities at 25° C. and a shear rate of 0.9 s$^{-1}$ after 10 minutes at rest and after 24 hours at rest be respectively $\eta_0$ and $\eta_{24}$, it is preferable for $\theta_{24}/\eta_0 \le 2$, more preferable for $1 \le \eta_{24}/\eta_0 \le 2$, and even more preferable for $1 \le \theta_{24}/\eta_0 \le 1.8$. When $\eta_{24}/\eta_0 > 2$, the pot life following uniform mixture may be short, lowering the ease of operations.

This addition-curable self-adhesive silicone rubber composition has a curing speed such that, placing importance on the efficiency of the operations, letting the 10% and 90% curing times in 3-minute measurement at 110° C. (that is, the times from the start of measurement at which 10% and 90% torque is imparted relative to the maximum torque at 3 minutes from the start of measurement at 110° C.) with a curability tester [a rotorless type disk rheometer, moving die rheometer or MDR 2000 (from Alpha Technologies)] be T10 and T90, it is preferable for 10 seconds≤T10≤60 seconds and T10≤T90≤T10+50 seconds, and more preferable for 15 seconds≤T10≤50 seconds and T10≤T90≤T10+40 seconds. At a curing speed such that 10 seconds≤T10≤60 seconds and T10≤T90≤T10+50 seconds, a good molding cycle is achieved.

[Method of Molding Addition-Curable Self-Adhesive Silicone Rubber Composition/Silicone Rubber Cured Product]

The method of molding or forming the addition-curable self-adhesive silicone rubber composition may be freely selected according to the viscosity of the mixture. For example, any of the following methods may be used: injection molding, compression molding, dispenser molding, injection molding, extrusion and transfer molding.

In particular, to take full advantage of the adhesive properties of the inventive composition, it is preferable to use, for example, an insert molding process in which the adherend (organic resin) is first set in a mold and the uncured composition is brought into contact therewith and cured so as to obtain a molded product in which both materials are integrally united, or two-color molding which obtains an integrally formed product by alternately injecting an organic resin and the inventive composition, both of which are molten or uncured, into a mold.

The inventive composition is one that is capable of adhering well to organic resins. Organic resins used as the adherend are exemplified by thermoplastic resins, such as ordinary olefin polymerization systems or condensation polymerization systems. Specific examples include acrylonitrile-butadiene-styrene (ABS) resins, polycarbonate (PC) resins, polyurethane (PU) resins, styrene resins, polyethylene (PE) resins, polypropylene (PP) resins, acrylic resins, polyethylene terephthalate (PET) resins, polybutylene terephthalate (PBT) resins, polyphenylene oxide (PPO) resins, polyphenylene sulfide (PPS) resins, polysulfone resins, nylon (PA) resins, aromatic polyamide (aromatic PA) resins, polyimide (PI) resins and liquid crystal resins.

As for the curing conditions, molding under applied heat can be carried out at generally between 60° C. and 220° C. for a period of from 5 seconds to 1 hour. However, to manifest a strong adhesion with thermoplastic resins and the like, molding is preferably carried out under temperature and curing time conditions at which the resin does not deform, melt or deteriorate. Although the optimal conditions will vary with the type of resin and the thickness of the rubber, it is possible to obtain an integrally molded article under curing conditions of, in the case of resins having a high softening point, between 120° C. and 220° C. for a period of from about 5 seconds to about 5 minutes, and in the case of resins having a low softening point, between 60° C. and 120° C. for a period of from about 15 seconds to about 30 minutes.

The cured product obtained by curing the addition-curable self-adhesive silicone rubber composition (silicone rubber cured product) has a compression set, as measured after 22 hours of compression at a compressibility of 25% and 150° C. based on JIS K 6249:2003, that is preferably 30% or less. At a compression set of 30% or less, the silicone rubber composition is particularly suitable as a material for O-rings and packings. Such a compression set can be achieved by using a composition arrived by uniformly blending component (D) in the above-indicated ratio in an addition-curable self-adhesive silicone rubber composition that includes components (A) to (C) and (E).

The silicone rubber cured product thus obtained, in cases where an article that is integrally molded of a silicone rubber composition and a thermoplastic resin is to be used, as mentioned above, in automotive parts, communications equipment and various electrical and electronic products, enables molding to be carried out at a relatively low temperature and short time, yet has a pot life sufficient for working and moreover is capable of giving a cured product having a low compression set.

EXAMPLES

The invention is illustrated more fully below by way of Examples and Comparative Examples, although the invention is not limited by these Examples. In the Examples below, "parts" stands for parts by weight. Also, "average degree of polymerization" refers to the number-average degree of polymerization.

Preparation Example 1

Sixty parts of dimethylpolysiloxane (A1) which is capped at both ends of the molecular chain with dimethylvinylsiloxy groups and has an average degree of polymerization of 750, 40 parts of fumed silica (F1) having a BET specific surface area of 300 m²/g (Aerosil 300, from Nippon Aerosil Co., Ltd.), 8.0 parts of hexamethyldisilazane and 2.0 parts of water were mixed together at room temperature for 60 minutes, after which the temperature was raised to 150° C. and the mixture was stirred for 4 hours. Another 30 parts of dimethylpolysiloxane (A1) was then added and mixing was carried out to uniformity, after which the mixture was cooled, giving Silicone Rubber Base A.

Example 1

The following were added to 100 parts of Silicone Rubber Base A: 5.70 parts of dimethylpolysiloxane (A2) which is capped at both ends of the molecular chain with dimethylvinylsiloxy groups and has an average degree of polymerization of 220; 5.03 parts of a dimethylpolysiloxane (A3) which is capped at both ends of the molecular chain with trimethylsiloxy groups, in which 5 mol % of pendant (referring, here and below, to monovalent groups or atoms bonded to silicon atoms in the diorganosiloxane units making up the main chain) methyl groups are vinyl groups and which has an average degree of polymerization of 200:0.34 part of a phenylene skeleton-containing adhesion modifier (B-1) of formula (1) below (SiH content, 0.0079 mol/g):

[Chem. 17]

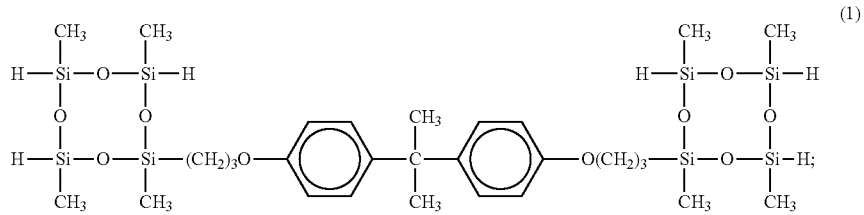

(1)

1.15 parts of, as a crosslinking agent, a methylhydrogenpolysiloxane (B-2-1) which is capped at both ends of the molecular chain with trimethylsiloxy groups and has pendant SiH groups (this being a dimethylsiloxane/methylhydrogensiloxane copolymer capped at both ends of the molecular chain with trimethylsiloxy groups and having a degree of polymerization of 64 and a SiH group content of 0.0113 mol/g): 0.23 part of a dimethylpolysiloxane (B-2-2) which is capped at both ends with dimethylhydrogensiloxy groups and has no pendant Si—H groups (average degree of polymerization, 20; Si—H group content, 0.0014 mol/g): 0.13 part of a benzotriazole derivative (D1) of formula (2) below:

[Chem. 18]

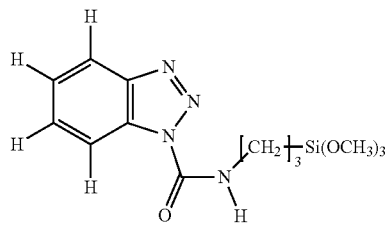

(2)

(benzotriazole derivative/Pt atoms=48 mol/mol); and 0.04 part of ethynylcyclohexanol (E1) (acetylene/Pt atoms=38 mol/mol) as a reaction regulator. The above were stirred for 15 minutes, 0.17 part of a toluene solution (C1) of a complex of platinum and 1,3-divinyl-1,1,3,3-tetramethyldisiloxane (platinum atoms, 1 wt %) was added and 30 minutes of stirring was carried out, giving a uniform Silicone Rubber Blend A.

In this mixture, the ratios of the Si—H groups included in components (B-1) and (B-2) with respect to the total Si—H groups in the overall mixture are 15 mol % for component (B-1) and 85 mol % for component (B-2), and the molar ratio of the overall amount of Si—H groups to the overall amount of vinyl groups (Si—H groups/vinyl groups) in the entire composition was 2.4.

The curability of Silicone Rubber Blend A at 110° C. was measured with an MD R2000 Rheometer (Alpha Technologies). The result is present in Table 1.

In addition, the viscosities $\eta_0$ and $\eta_{24}$ of Silicone Rubber Blend A were measured at a shear rate of 0.9 s$^{-1}$ after being mixed and left at rest at 25° C. for 10 minutes and after being mixed and left at rest at 25° C. for 24 hours. The results are presented in Table 1.

Table 1 shows the result of compression set measurement on the cured product obtained by carrying out a 15-minute press cure at 120° C.

Also, a polycarbonate (PC) test piece (approx. 25×50 mm) was placed in a frame (approx. 50 mm×70 mm), Silicone Rubber Composition A (approx. 4 to 20 g) was placed on top thereof, and a 5-minute press cure was carried out at 110° C. (rubber thickness, 1 to 3 mm). The integrally molded product was peeled by hand and the adhesion was evaluated using the cohesive failure ratio [rubber failure ratio=percent (%) of surface that did not separate at the interface and incurred rubber failure (cohesive failure) with respect to surface area of entire adhesive interface]. The result is likewise shown in Table 1.

Example 2

The following were added to 100 parts of Silicone Rubber Base A: 6.31 parts of dimethylpolysiloxane (A1) which is capped at both ends of the molecular chain with dimethylvinylsiloxy groups and has an average degree of polymerization of 220; 5.64 parts of dimethylpolysiloxane (A2) which is capped at both ends of the molecular chain with trimethylsiloxy groups, in which 5 mol % of pendant methyl groups are vinyl group and which has an average degree of polymerization of 200; 0.33 part of the phenylene skeleton-containing adhesion modifier (B-1) of Example 1:1.09 parts of, as a crosslinking agent, a methylhydrogenpolysiloxane (B-2-1) which is capped at both ends of the molecular chain with trimethylsiloxy groups and has pendant SiH groups: 0.13 part of a benzotriazole derivative (D1) (benzotriazole derivative/Pt atoms=48 mol/mol); and 0.03 part of ethynylcyclohexanol (E1) (acetylene/Pt atoms=32 mol/mol) as a reaction regulator. The above were stirred for 15 minutes, following which 0.17 part of a toluene solution (C1) of a complex of platinum and 1,3-divinyl-1,1,3,3-tetramethyldisiloxane was added and 30 minutes of stirring was carried out, giving a uniform Silicone Rubber Blend B. Table 1 shows the results obtained by carrying out the same evaluations as in Example 1.

In this mixture, the ratios of the Si—H groups included in components (B-1) and (B-2) with respect to the total Si—H groups in the overall mixture are 16 mol % for component (B-1) and 84 mol % for component (B-2), and the molar ratio of the overall amount of Si—H groups to the overall amount of vinyl groups in the entire composition (Si—H groups/vinyl groups) was 2.1.

Example 3

Aside from changing the benzotriazole derivative D1 to 0.20 part (benzotriazole derivative/Pt atoms=48 mol/mol) of the benzotriazole derivative (D2) shown in formula (3) below:

[Chem. 19]

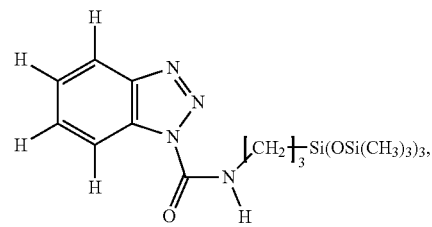

(3)

Silicone Rubber Blend C was prepared in exactly the same way as in Example 1. Table 1 shows the results obtained by carrying out the same evaluations as in Example 1.

Comparative Example 1

Aside from not adding the benzotriazole derivative (D1), Silicone Rubber Blend D was prepared in exactly the same way as in Example 1. Table 1 shows the results obtained by carrying out the same evaluations as in Example 1.

Comparative Example 2

Aside from adjusting the phenylene skeleton-containing adhesion modifier (B-1) to 1.33 parts, the methylhydrogenpolysiloxane (B-2-1) capped at both ends of the molecular chain with trimethylsiloxy groups and having pendant SiH groups as the crosslinking agent to 0.57 part, and the dimethylpolysiloxane (B-2-2) capped at both ends with dimethylhydrogensiloxy groups and having pendant Si—H groups to 0.33 part, Silicone Rubber Blend E was prepared in exactly the same way as in Example 1. Table 1 shows the results obtained by carrying out the same evaluations as in Example 1. In this mixture, the ratios of the Si—H groups included in components (B-1) and (B-2) with respect to the total Si—H groups in the overall mixture are 58 mol % for component (B-1) and 42 mol % for component (B-2), and the molar ratio of the overall amount of Si—H groups to the overall amount of vinyl groups in the entire composition (Si—H groups/vinyl groups) was 2.4.

Comparative Example 3

Aside from not including the phenylene skeleton-containing adhesion modifier (B-1) and adjusting, as a crosslinking agent, the methylhydrogenpolysiloxane (B-2-1) capped at both ends of the molecular chain with trimethylsiloxy groups and having pendant SiH groups to 1.46 part and the dimethylpolysiloxane (B-2-2) capped at both ends with dimethylhydrogensiloxy groups and having pendant Si—H groups to 0.30 part, Silicone Rubber Blend F was prepared in exactly the same way as in Example 1. Table 1 shows the results obtained by carrying out the same evaluations as in Example 1. The molar ratio of the overall amount of Si—H groups to the overall amount of vinyl groups in the entire composition (Si—H groups/vinyl groups) was 2.4.

Comparative Example 4

Aside from adding 0.054 part of benzotriazole (benzotriazole/Pt atoms=18 mol/mol) instead of the benzotriazole derivative (D1), Silicone Rubber Blend G was prepared in exactly the same way as in Example 1. Table 1 shows the results obtained by carrying out the same evaluations as in Example 1.

Comparative Example 5

Aside from adding 0.003 part of benzotriazole (benzotriazole/Pt atoms=1 mol/mol) instead of the benzotriazole derivative (D1), Silicone Rubber Blend H was prepared in exactly the same way as in Example 1. Table 1 shows the results obtained by carrying out the same evaluations as in Example 1.

TABLE 1

|  | Example | | | Comparative Example | | | | |
| --- | --- | --- | --- | --- | --- | --- | --- | --- |
|  | 1 | 2 | 3 | 1 | 2 | 3 | 4 | 5 |
| Curability T10 (sec) | 31 | 31 | 35 | 32 | 41 | 37 | 43 | 29 |
| Curability T90 (sec) | 55 | 68 | 60 | 63 | 254 | 65 | 216 | 84 |
| $\eta_0$ (Pa · s) | 1,220 | 1,270 | 887 | 800 | 1,230 | 1,130 | 871 | 840 |
| $\eta_{24}$ (Pa · s) | 1,530 | 1,490 | 1,110 | 3,190 | 1,600 | 1,430 | 1,030 | 1,080 |
| $\eta_{24}/\eta_0$ | 1.3 | 1.2 | 1.3 | 4.0 | 1.3 | 1.3 | 1.2 | 1.3 |
| Compression set (%) | 29 | 23 | 29 | 65 | 48 | 27 | 24 | 43 |
| Adhesion | ○ | ○ | ○ | ○ | ○ | × | ○ | ○ |

○: Cohesive failure ratio was 90% or more
x: Cohesive failure ratio was 0% (did not adhere)

The invention claimed is:

1. An addition-curable self-adhesive silicone rubber composition comprising:

(A) 100 parts by weight of an alkenyl group-containing organopolysiloxane having at least two silicon-bonded alkenyl groups per molecule;

(B-1) 0.05 to 10 parts by weight of an organosilicon compound of from 1 to 100 silicon atoms having at least one phenylene skeleton and at least one silicon-bonded hydrogen atom per molecule;

(B-2) 0.2 to 30 parts by weight of an organohydrogenpolysiloxane that has at least two silicon-bonded hydrogen atoms per molecule and is free of aromatic groups, such that the number of moles of silicon-bonded hydrogen groups (Si—H groups) in, respectively, component (B-1) and component (B-2) relative to the total number of moles of silicon-bonded hydrogen atoms (total Si—H groups) in components (B-1) and (B-2) satisfies the condition [Si—H groups (B-1]/[total Si—H groups]=1 to 30 mol % and [Si—H groups (B-2)]/[total Si—H groups]=70 to 99 mol %;

(C) a platinum-based catalyst in an amount, expressed in terms of the weight of platinum metal with respect to the total weight of components (A), (B-1) and (B-2), that is from 0.5 to 500 ppm;

(D) a benzotriazole derivative of the general formula (I) below:

[Chem. 1]

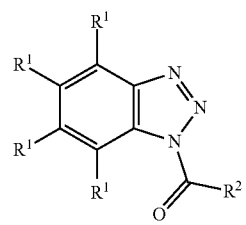

wherein $R^1$ is a hydrogen atom or a monovalent hydrocarbon group of 1 to 6 carbon atoms, $R^2$ is a monovalent hydrocarbon group of 1 to 15 carbon atoms or a group of the formula (I') below:

[Chem. 2]

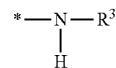

wherein $R^3$ is —$(CH_2)_a$—$Si(OR^4)_3$, $R^4$ is an alkyl group of 1 to 4 carbon atoms or a $SiR^5{}_3$ group ($R^5$ being an alkyl group of 1 to 4 carbon atoms), a is an integer from 1 to 6, and * represents a site available for bonding, in an amount of 2 to 100 moles per mole of platinum atoms in component (C); and (E) an acetylene alcohol compound or a compound obtained by modifying the alcoholic hydroxyl group thereon with a silane or siloxane, in an amount of 1 to 500 moles of acetylene per mole of platinum atoms in component (C).

2. The addition-curable self-adhesive silicone rubber composition of claim 1, wherein the molar ratio of total Si—H groups to the sum of the alkenyl groups in the silicone rubber composition (total alkenyl groups), expressed as [total Si—H groups/total alkenyl groups], is from 2.0 to 3.0.

3. The addition-curable self-adhesive silicone rubber composition of claim 1, further comprising (F) a reinforcing silica fine powder in an amount of 5 to 100 parts by weight per 100 parts by weight of component (A).

4. The addition-curable self-adhesive silicone rubber composition of claim 3, wherein component (F) is a fumed silica having a BET specific surface area of at least 50 m$^2$/g.

5. The addition-curable self-adhesive silicone rubber composition of claim 1 which, letting the viscosities at a shear rate of 0.9 s$^{-1}$ after being uniformly mixed and left at rest at 25° C. for 10 minutes and after being uniformly mixed and left at rest at 25° C. for 24 hours be respectively $\eta_0$ and $\eta_{24}$, satisfies the condition $\eta_{24}/\eta_0 \leq 2$.

6. A silicone rubber cured product obtained by curing the silicone rubber composition of claim 1, has a compression set, as measured after 22 hours of compression at a compressibility of 25% and 150° C. based on JIS K 6249:2003, that is 30% or less.

* * * * *